US012677188B2

(12) United States Patent
　　Koskinen

(10) Patent No.: US 12,677,188 B2
(45) Date of Patent: Jul. 7, 2026

(54) BUFFER-STATUS REPORTS WITH MULTIPLE SIZE FIELDS FOR THE SAME BUFFER

(71) Applicant: Nokia Technologies Oy, Espoo (FI)

(72) Inventor: Henri Markus Koskinen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 335 days.

(21) Appl. No.: 18/432,237

(22) Filed: Feb. 5, 2024

(65) Prior Publication Data

US 2024/0284248 A1　　Aug. 22, 2024

Related U.S. Application Data

(60) Provisional application No. 63/446,068, filed on Feb. 16, 2023.

(51) Int. Cl.
　　*H04W 28/02*　　(2009.01)
　　*H04W 28/06*　　(2009.01)

(52) U.S. Cl.
　　CPC ....... *H04W 28/0278* (2013.01); *H04W 28/06* (2013.01)

(58) Field of Classification Search
　　CPC .. H04W 28/06; H04W 28/0278; H04W 72/21
　　See application file for complete search history.

(56) References Cited

U.S. PATENT DOCUMENTS

| | | | | |
|---|---|---|---|---|
| 2019/0261402 A1* | 8/2019 | Asterjadhi | ............ | H04W 72/21 |
| 2020/0196185 A1* | 6/2020 | Babaei | ................. | H04W 72/21 |
| 2021/0168841 A1* | 6/2021 | Vankayala | ............ | H04W 72/21 |
| 2022/0104124 A1* | 3/2022 | Shah | ................. | H04W 72/1263 |
| 2022/0210815 A1 | 6/2022 | Chen | | |

(Continued)

FOREIGN PATENT DOCUMENTS

| | | |
|---|---|---|
| WO | 2020/199829 A1 | 10/2020 |
| WO | 2022/234846 A1 | 11/2022 |

OTHER PUBLICATIONS

Extended European Search Report received for corresponding European Patent Application No. 24154395.8, dated Jun. 24, 2024, 10 pages.

(Continued)

*Primary Examiner* — Brian D Nguyen
(74) *Attorney, Agent, or Firm* — Barta Jones, PLLC

(57) ABSTRACT

An apparatus may be configured to: determine to report an amount of data in a transmission buffer; determine respective values for a plurality of buffer-size fields that are configured to jointly indicate the amount of data in the transmission buffer, wherein the respective values are determined based on the amount of data in the transmission buffer; generate a buffer-status report, wherein the buffer-status report comprises, at least, the plurality of buffer-size fields; generate a protocol data unit, wherein the protocol data unit comprises, at least, the buffer-status report; and transmit the protocol data unit. An apparatus may be configured to: receive, from a user equipment, a protocol data unit; and determine at least one of: a lower bound for the data in the transmission buffer, or an upper bound for the data in the transmission buffer based on the plurality of buffer-size fields.

20 Claims, 5 Drawing Sheets

(56) References Cited

U.S. PATENT DOCUMENTS

2022/0376842 A1* 11/2022 Han ..................... H04W 72/20
2025/0016674 A1* 1/2025 Shah ................ H04W 52/0232

OTHER PUBLICATIONS

"3rd Generation Partnership Project; Technical Specification Group Radio Access Network; NR; Medium Access Control (MAC) protocol specification (Release 17)", 3GPP TS 38.321, V17.2.0, Sep. 2022, pp. 1-246.
"Revised SID : Study on XR Enhancements for NR", 3GPP TSG RAN Meeting #95e, RP-220285, Agenda: 9.2.8, Nokia, Mar. 17-23, 2022, 5 pages.
"3rd Generation Partnership Project; Technical Specification Group Radio Access Network; NR; Study on XR enhancements for NR (Release 18)", 3GPP TR 38.835, V1.0.0, Dec. 2022, pp. 1-121.
"New WID on XR Enhancements for NR", 3GPP TSG RAN Meeting #98-e, RP-223502, Agenda: 9.1.2, Nokia, Dec. 12-16, 2022, pp. 1-5.
"UE feedback enhancements for XR capacity", 3GPP TSG-RAN2#119bis-e, R2-2209650, Agenda: 8.5.4.1, ZTE Corporation, Oct. 2022, 3 pages.
PCT Application No. PCT/US2022/045164, "Dynamic Bsr Tables for Uplink Buffer Size Estimation", filed on Sep. 29, 2022, pp. 1-89.
"3rd Generation Partnership Project; Technical Specification Group Radio Access Network; NR; Packet Data Convergence Protocol (PDCP) specification (Release 17)", 3GPP TS 38.323, V17.3.0, Dec. 2022, pp. 1-48.

* cited by examiner

| LCG ID | Buffer Size 1 | Oct 1 |
|--------|---------------|-------|
| Buffer Size 2 | | Oct 2 |

500 determine to report an amount of data in a transmission buffer    510

determine respective values for a plurality of buffer-size fields that are configured to jointly indicate the amount of data in the transmission buffer, wherein the respective values are determined based on the amount of data in the transmission buffer    520

generate a buffer-status report, wherein the buffer-status report comprises, at least, the plurality of buffer-size fields    530

generate a protocol data unit, wherein the protocol data unit comprises, at least, the buffer-status report    540

transmit the protocol data unit    550

FIG. 5

600 receive, from a user equipment,
a protocol data unit, wherein
the protocol data unit
comprises, at least, a buffer-
status report, wherein the buffer
status report comprises, at
least, a plurality of buffer-size
fields that are configured to
jointly indicate an amount of
data in a transmission buffer of
the user equipment, wherein
respective values of the
plurality of buffer-size fields
comprise values that are
determined based on the
amount of data in the
transmission buffer

610

determine at least one of:

a lower bound for the
      data in the transmission
      buffer, or an upper bound for the
      data in the transmission
      buffer based on the plurality of buffer-
size fields

BUFFER-STATUS REPORTS WITH MULTIPLE SIZE FIELDS FOR THE SAME BUFFER

CROSS-REFERENCE TO RELATED APPLICATION

This application claims priority from, and the benefit of, U.S. Provisional Application No. 63/446,068, filed on 16 Feb. 2023, which is incorporated herein by reference in its entirety.

BACKGROUND

It is known, in network communications, for a user equipment (UE) to indicate uplink buffer status with a buffer status report (BSR).

FIELD OF EMBODIMENTS

The example and non-limiting embodiments relate generally to buffer status reports (BSR) and, more particularly, to buffer size field(s) within the BSR.

SUMMARY

The following summary is merely intended to be illustrative. The summary is not intended to limit the scope of the claims.

In accordance with one aspect, an apparatus comprising: at least one processor; and at least one memory storing instructions that, when executed by the at least one processor, cause the apparatus at least to: determine to report an amount of data in a transmission buffer; determine respective values for a plurality of buffer-size fields that are configured to jointly indicate the amount of data in the transmission buffer, wherein the respective values are determined based on the amount of data in the transmission buffer; generate a buffer-status report, wherein the buffer-status report comprises, at least, the plurality of buffer-size fields; generate a protocol data unit, wherein the protocol data unit comprises, at least, the buffer-status report; and transmit the protocol data unit.

In accordance with one aspect, a method comprising: determining, with a user equipment, to report an amount of data in a transmission buffer; determining respective values for a plurality of buffer-size fields that are configured to jointly indicate the amount of data in the transmission buffer, wherein the respective values are determined based on the amount of data in the transmission buffer; generating a buffer-status report, wherein the buffer-status report comprises, at least, the plurality of buffer-size fields; generating a protocol data unit, wherein the protocol data unit comprises, at least, the buffer-status report; and transmitting the protocol data unit.

In accordance with one aspect, an apparatus comprising means for performing: determining to report an amount of data in a transmission buffer; determining respective values for a plurality of buffer-size fields that are configured to jointly indicate the amount of data in the transmission buffer, wherein the respective values are determined based on the amount of data in the transmission buffer; generating a buffer-status report, wherein the buffer-status report comprises, at least, the plurality of buffer-size fields; generating a protocol data unit, wherein the protocol data unit comprises, at least, the buffer-status report; and transmitting the protocol data unit.

In accordance with one aspect, a non-transitory computer-readable medium comprising program instructions stored thereon for performing at least the following: determining to report an amount of data in a transmission buffer; determining respective values for a plurality of buffer-size fields that are configured to jointly indicate the amount of data in the transmission buffer, wherein the respective values are determined based on the amount of data in the transmission buffer; generating a buffer-status report, wherein the buffer-status report comprises, at least, the plurality of buffer-size fields; generating a protocol data unit, wherein the protocol data unit comprises, at least, the buffer-status report; and causing transmitting of the protocol data unit.

In accordance with one aspect, an apparatus comprising: at least one processor; and at least one memory storing instructions that, when executed by the at least one processor, cause the apparatus at least to: receive, from a user equipment, a protocol data unit, wherein the protocol data unit comprises, at least, a buffer-status report, wherein the buffer status report comprises, at least, a plurality of buffer-size fields that are configured to jointly indicate an amount of data in a transmission buffer of the user equipment, wherein respective values of the plurality of buffer-size fields comprise values that are determined based on the amount of data in the transmission buffer; and determine at least one of: a lower bound for the data in the transmission buffer, or an upper bound for the data in the transmission buffer based on the plurality of buffer-size fields.

In accordance with one aspect, a method comprising: receiving, from a user equipment, a protocol data unit, wherein the protocol data unit comprises, at least, a buffer-status report, wherein the buffer status report comprises, at least, a plurality of buffer-size fields that are configured to jointly indicate an amount of data in a transmission buffer of the user equipment, wherein respective values of the plurality of buffer-size fields comprise values that are determined based on the amount of data in the transmission buffer; and determining at least one of: a lower bound for the data in the transmission buffer, or an upper bound for the data in the transmission buffer based on the plurality of buffer-size fields.

In accordance with one aspect, an apparatus comprising means for performing: receiving, from a user equipment, a protocol data unit, wherein the protocol data unit comprises, at least, a buffer-status report, wherein the buffer status report comprises, at least, a plurality of buffer-size fields that are configured to jointly indicate an amount of data in a transmission buffer of the user equipment, wherein respective values of the plurality of buffer-size fields comprise values that are determined based on the amount of data in the transmission buffer; and determining at least one of: a lower bound for the data in the transmission buffer, or an upper bound for the data in the transmission buffer based on the plurality of buffer-size fields.

In accordance with one aspect, a non-transitory computer-readable medium comprising program instructions stored thereon for performing at least the following: causing receiving, from a user equipment, of a protocol data unit, wherein the protocol data unit comprises, at least, a buffer-status report, wherein the buffer status report comprises, at least, a plurality of buffer-size fields that are configured to jointly indicate an amount of data in a transmission buffer of the user equipment, wherein respective values of the plurality of buffer-size fields comprise values that are determined based on the amount of data in the transmission buffer; and determining at least one of: a lower bound for the data in the transmission buffer, or an upper bound for the data in the transmission buffer based on the plurality of buffer-size fields.

According to some aspects, there is provided the subject matter of the independent claims. Some further aspects are defined in the dependent claims.

BRIEF DESCRIPTION OF THE SEVERAL VIEWS OF THE DRAWINGS

The foregoing aspects and other features are explained in the following description, taken in connection with the accompanying drawings, wherein:

FIG. 5 is a flowchart illustrating steps as described herein; and

FIG. 6 is a flowchart illustrating steps as described herein.

DETAILED DESCRIPTION OF EMBODIMENTS

Figure 1:
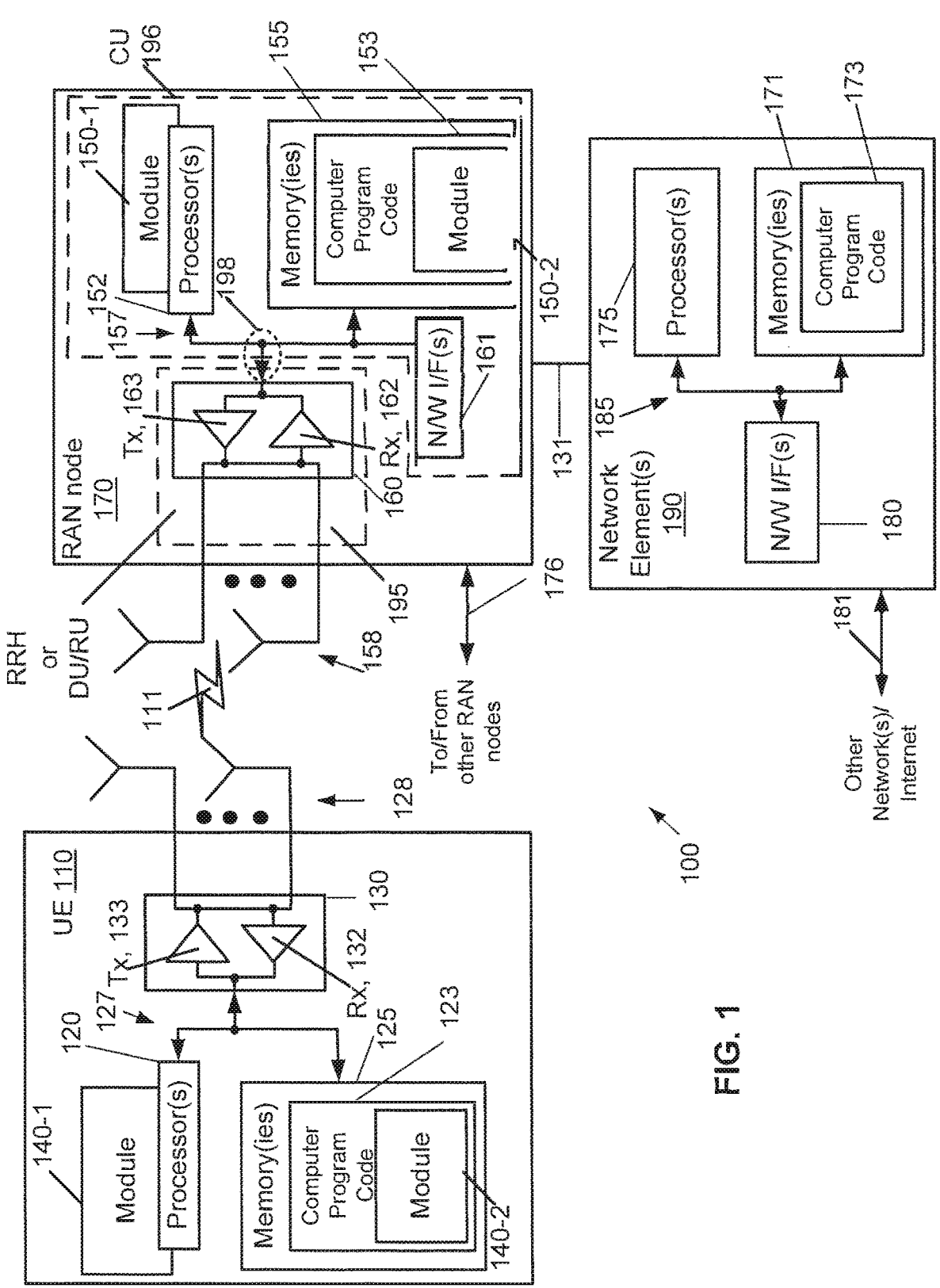
FIG. 1 is a block diagram of one possible and non-limiting example system in which the example embodiments may be practiced.

The following abbreviations that may be found in the specification and/or the drawing figures are defined as follows:

3GPP third generation partnership project
5G fifth generation
5GC 5G core network
6G sixth generation
ADC analog to digital converter
AMF access and mobility management function
AR augmented reality
BS(R) buffer status (report)
CE control element
CRAN cloud radio access network
CU central unit
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
IAB integrated access and backhaul
I/F interface
L1 layer 1
LCG logical-channel group
LCH logical channel
LCID logical-channel identity
LTE long term evolution
MAC medium access control
MME mobility management entity
MR mixed reality
ng or NG new generation
ng-eNB or NG-eNB new generation eNB NR new radio
N/W or NW network
O-RAN open radio access network
PDCP packet data convergence protocol
PDU protocol data unit
PHY physical layer
RAN radio access network
RF radio frequency
RLC radio link control
RRC radio resource control
RRH remote radio head
RS reference signal
RU radio unit
Rx receiver
SDAP service data adaptation protocol
SGW serving gateway
SMF session management function
TTI transmission time interval
Tx transmitter
UE user equipment (e.g., a wireless, typically mobile device)
UPF user plane function
VNR virtualized network function
VR virtual reality
WUR wake up receiver
WUS wake up signal
XR extended reality (e.g. AR, MR, VR, etc.)

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. A "circuit" may include dedicated hardware or hardware in association with software executable thereon. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR), and/or 5G-Advanced (i.e. NR Rel-18 and beyond) and/or 6G. In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station, access point, access node, or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely illustrative functions that may be supported by the network element(s) 190, and note that both 5G and LTE functions might be supported. The RAN node 170 is coupled via a link 131 to a network element 190. The link 131 may be implemented as, e.g., an NG interface for 5G, or an SI interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. For example, a network may be deployed in a tele cloud, with virtualized network functions (VNF) running on, for example, data center servers. For example, network core functions and/or radio access network(s) (e.g. CloudRAN, O-RAN, edge cloud) may be virtualized. Note that the virtualized entities that result from the network virtualization are still implemented, at some level, using hardware such as processors 152 or 175 and memories 155 and 171, and also such virtualized entities create technical effects.

It may also be noted that operations of example embodiments of the present disclosure may be carried out by a plurality of cooperating devices (e.g. cRAN).

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the example embodiments of the present disclosure, example embodiments will now be described with greater specificity.

Figure 2:
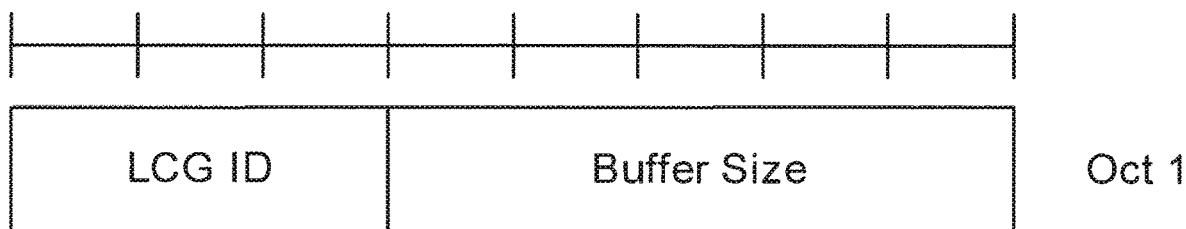
FIG. 2 is a diagram illustrating features as described herein.

Features as described herein generally relate to buffer status reports (BSR). BSR is a MAC control element (MAC CE) that carries the information of how much data is in the UE buffer to be sent out. It is supported in both LTE and NR standards for optimizing the UL resource usage by the network. In 3GPP NR MAC (TS 38.321), the UE informs the network of the amount of uplink data that it has available for transmission by sending a buffer status report (BSR) MAC control element (CE) which indicates buffer status per logical-channel group (LCG). There are a number of different BSR formats defined, where the buffer status is indicated using either a 5-bit or an 8-bit value, the value range of both of which is tabularized in the MAC specification. The format of the Short BSR is illustrated in FIG. 2. The example of FIG. 2 may also be applicable to the Short truncated BSR MAC CE. TABLE 1 shows 5-bit buffer-size values for the Short BSR:

TABLE 1

| Index | BS value |
|-------|----------|
| 0 | 0 |
| 1 | ≤10 |
| 2 | ≤14 |
| 3 | ≤20 |
| 4 | ≤28 |
| 5 | ≤38 |
| 6 | ≤53 |
| 7 | ≤74 |
| 8 | ≤102 |
| 9 | ≤142 |
| 10 | ≤198 |
| 11 | ≤276 |
| 12 | ≤384 |
| 13 | ≤535 |
| 14 | ≤745 |
| 15 | ≤1038 |
| 16 | ≤1446 |
| 17 | ≤2014 |
| 18 | ≤2806 |
| 19 | ≤3909 |
| 20 | ≤5446 |
| 21 | ≤7587 |
| 22 | ≤10570 |
| 23 | ≤14726 |
| 24 | ≤20516 |
| 25 | ≤28581 |
| 26 | ≤39818 |
| 27 | ≤55474 |
| 28 | ≤77284 |
| 29 | ≤107669 |
| 30 | ≤150000 |
| 31 | >150000 |

Figure 3:
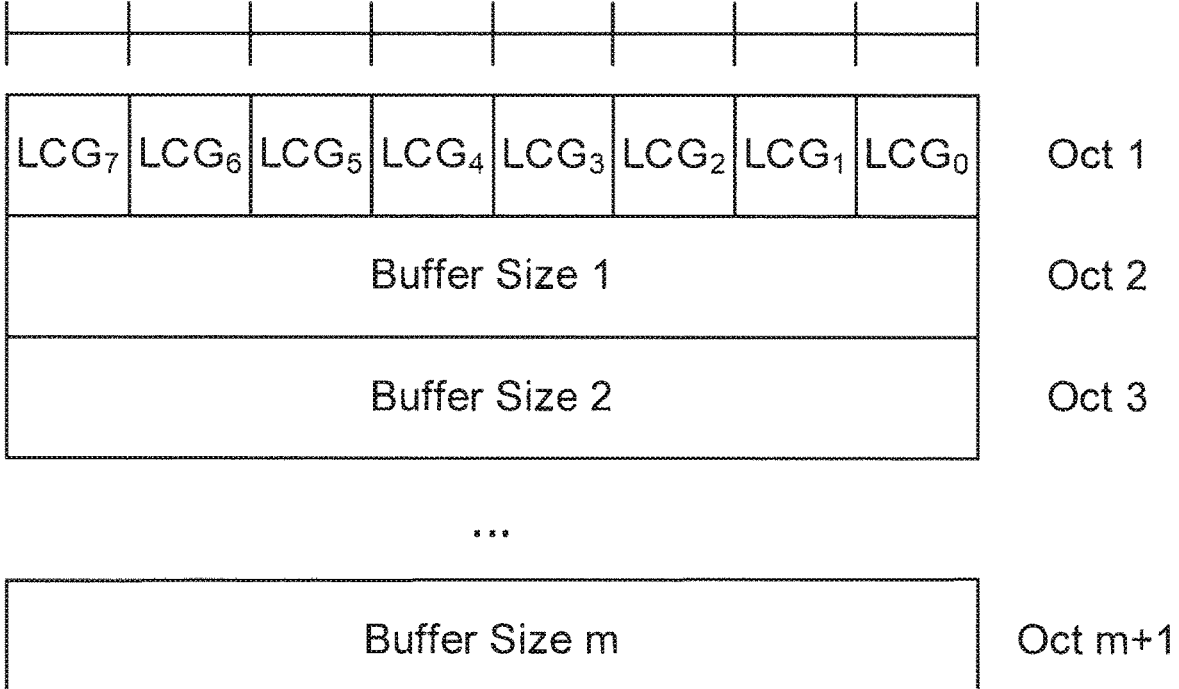
FIG. 3 is a diagram illustrating features as described herein.

As illustrated in TABLE 1, to allow a very wide range of values while keeping the relative reporting error constant, the successive values grow exponentially, such that the next value is roughly 1.4 times the previous (non-zero) one. Similarly, in the table for 8-bit values, the next value is roughly 1.065 times the previous one, with the highest two range-limit values being about 76 Mbyte and 81 Mbyte. The format of the Long BSR using 8-bit values is illustrated in FIG. 3, consisting of a data-availability bitmap representing different LCGs, followed by an 8-bit buffer-size indication for each LCG for which the bitmap indicates data availability. The example illustrated in FIG. 3 may also be applicable to Long truncated BSR and/or pre-emptive BSR MAC CE.

In the ongoing 3GPP RAN Rel-18 Study on extended-reality (XR) enhancements for NR, the reporting errors that come with the currently defined BSR formats and value tables are identified as a problem wasting uplink capacity in the network. While still work in progress, the current technical report (TR) 38.835v1.0.0 captures this:

" . . . 5 XR Enhancements for NR 5.3 Capacity Improvements Techniques 5.3.2 Layer 2 Enhancements In order to enhance the scheduling of uplink resources for XR, the following improvements are envisioned:

One or more additional BS table(s) to reduce the quantisation errors in BSR reporting (e.g. for high bit rates);

. . .

6 Conclusions

In conclusion of the study, the following enhancements for XR services are recommended:

. . .

For Capacity Enhancements:

. . .

BSR enhancements including at least new BS Table(s) . . . "

Consequently, "BSR enhancements including at least new BS Table(s)" was agreed upon as an objective in a Rel-18 work item, to start from beginning of 2023.

To tackle the reporting error, PCT/US2022/045164, filed Oct. 24, 2022, which is hereby incorporated in its entirety, proposes: ways for the network and/or the UE to generate new buffer-size tables for BSR based on observed traffic; and that more than one BSR could be triggered for the same LCH/LCG in the same transmission-time interval (TTI) so that the sum is as accurate as possible.

3GPP contribution R2-2209650 proposes:

" . . . Proposal 1: To enable finer granularity for BSR, more than one BSR MAC CE for same LCG can be included in one MAC PDU and the actual buffer size value is calculated using all the BSR MAC CEs for the same LCG included in the MAC PDU . . . "

Beside their advantages, the BSR enhancements considered above come with the following expected complications in their standardization discussions.

One complication may relate to new buffer-size tables. If to be generated by the UE (as instructed by the network), it may be difficult to standardize the numerical generation well enough to ensure identical tables at network and UE sides. Also, the standardization discussion required to agree on how exactly the network instructs the UE to generate the table may be very slow, or too slow, to converge. Also, it may be difficult to ensure forward-compatibility with, for example, higher-layer control PDUs introduced in the future, whose small size may lie well outside the buffer-size distribution resulting from user-plane traffic alone.

If to be generated by the network (and signaled to the UE), signaling a new 8-bit table would seem to take 255 instances of 32-bit integers (considering the current maximum value of ~80 Mbyte), which implies an RRC Reconfiguration of over 1000 bytes in size. Such a size may be considered prohibitive to transmit, for example as part of a handover command, requiring a second RRC Reconfiguration after handover. Either way, the signaling overhead incurred seems significant.

If to be fixed in the standard, it may be difficult for 3GPP to conclude on proper value tables, considering the different possible scenarios with respect to applications, codecs and their parameters (e.g. video resolution, frame rate, etc.) that need to be supported.

Another complication may relate to including more than one BSR MAC CE for the same LCG. In a MAC PDU, the existence of each CE is indicated using a MAC subheader: a 1-octet subheader without Length field for fixed-size CEs (such as the Short BSR, see, e.g., FIG. 2); and a 2-octet subheader with Length field for variable-size CEs (such as the Long BSR: see, e.g., FIG. 3).

Depending on whether or not the network knows how many BSRs to expect from the UE in a MAC PDU, the more than one BSR MAC CEs in a PDU may or may not each come with their own MAC subheaders. Either way, including multiple BSR MAC CEs comes with redundancy; if not in the form of multiple MAC subheaders, then at least in the form of multiple LCG indications preceding the buffer-size fields. The overhead sacrificed for this redundancy may instead be used for improving the accuracy of the buffer-size indication(s). In cases where the size of MAC PDU limits the BSR reporting, this overhead may even render useless the inclusion of more than one BSR MAC CEs.

In an example embodiment, in a given BSR MAC CE, more than one buffer-size field may be included for the same logical-channel group, such that their sum (e.g. the sum of upper limits/bounds of the indicated buffer-size values, when all finite) may indicate the total upper limit/bound of the buffer size for that LCG. Additionally or alternatively, the sum/subtraction of the lower limits/bounds of the indicated buffer-size values may indicate a total lower limit/bound of the buffer size for that LCG. A plurality of buffer-size fields (i.e. at least two) may be associated with data of a specific LCG).

In the present disclosure, the terms "bound" and "limit" may be used interchangeably.

In an example embodiment, the upper limits/bounds indicated with the buffer-size values and the lower limits/bound indicated with the buffer-size values may be predefined.

In an example embodiment, the upper bounds and lower bounds indicated with the plurality of buffer-size fields may be configured to describe a range of the buffer-size values.

In an example embodiment, in a given BSR MAC CE, more than one buffer-size field may be included for the same logical-channel group, such that their difference (e.g. the sum of upper limits of some indicated buffer-size values subtracted from the upper limit of another indicated buffer-size value, when all finite) may indicate the upper limit of the buffer size for that LCG. In other words, the indicated buffer-size values associated with an LCG may include A, B, C, and D. D−(A+B+C) may indicate the upper limit of the buffer size for that LCG.

In an example embodiment, a new "long Short BSR" may be introduced, where the current format (e.g. FIG. 2) may be followed by one or more 8-bit buffer-size fields; the LCG reported in the (long) Short BSR may have one or more 8-bit buffer-size fields. The number of 8-bit fields that apply may be indicated in the MAC header/subheader. In an example embodiment, a fixed-size MAC-CE format (e.g. with its own LCID value to use in the corresponding short MAC subheader that may then apply) may be defined for each possible number of 8-bit fields included. In this case, the reporting-overhead increase may be limited to those 8-bit fields. A technical effect of this example embodiment may be to minimize MAC-subheader overhead. In an alternative example embodiment, the Short BSR may be configured by RRC to be a variable-size MAC CE (currently fixed size), in which case the Length field in the longer MAC subheader that may then apply may reveal the number of 8-bit fields included/used.

In an example embodiment, the UE may determine to transmit the "long Short BSR" based on the LCG with which data in the buffer is associated. In other words, the UE may generate "long Short BSR" in response to the LCG. For example, a first LCG may trigger the UE to transmit multiple buffer-size fields (e.g. at least two) according to an example embodiment of the present disclosure, while a second LCG may not; rather, the UE may only transmit a single buffer-size field with respect to data in the buffer that is associated with the second LCG. Alternatively, the UE may be configured to transmit multiple buffer-size fields for all LCG. In other words, no matter what LCG data in the buffer is associated with, the UE may transmit multiple buffer-size fields; the UE may generate "long Short BSR" in response to the configuration of the UE. A UE may be configured to perform in this manner.

In an example embodiment, in the Long BSR, for one or more LCGs the buffer status may be indicated using more than one 8-bit buffer-size fields. In an example embodiment, the number of 8-bit fields and the applicable LCGs may be configured by RRC. In this case, because the Long BSR is already a variable-size MAC CE, a new MAC-CE format may not need to be defined for the purpose.

In an example embodiment, a condition for the UE to include the additional buffer-size fields for a LCG may be defined. In an example embodiment, the UE may be configured by RRC with the LCGs for which the additional buffer-size fields, and possibly how many of them, apply. Alternatively, the UE may include additional fields depending on the reporting error—absolute or relative—with the fields spent so far for the LCG in the BSR MAC CE being built. It may be noted that this may require some way for the network to know how to parse the BSR MAC CE.

In a padding BSR (i.e. when the BSR is being generated to replace padding bits in a MAC PDU), additional buffer-size fields may be included, for example if allowed by the number of padding bits.

In an example embodiment, if the MAC PDU has room only for the legacy Short BSR, then that may be included.

In an example embodiment, handling of truncated BSR may be defined. For example, when the full Long BSR does not fit in the MAC PDU being built, a truncated BSR may be included (e.g. a Short BSR, or a Long BSR including the buffer-size field only for the highest-priority LCGs with data available). In cases where the full Long BSR would contain more than one buffer-size fields for one or more LCGs, it may need to be specified whether or not that applies also in the Long Truncated BSR. In an example embodiment, the additional fields may also apply in the Long Truncated BSR, since the other alternative may come with the more convoluted case where the full Long BSR (with the proposed additional buffer-size fields) does not fit in the MAC PDU, but the legacy Long BSR (limited to one buffer-size field per LCG) may still leave room for padding bits in the MAC PDU.

A technical effect of example embodiments of the present disclosure may be to reduce reporting error in buffer-status reporting.

A technical effect of example embodiments of the present disclosure may be to improve the current buffer-status reporting accuracy, without: the need for new buffer-size tables; and/or the redundancy inherent in including more than one BSR MAC CE in a MAC PDU.

With respect to the "long Short BSR," a technical effect of example embodiments of the present disclosure may be to limit any increase in the reporting overhead to the additional buffer-size fields only (assuming introduction of new fixed-size MAC CE(s)). Assuming only one 8-bit field is included, a technical effect of example embodiments of the present disclosure may be to increase the reporting-value range from the 150000B-limit with the current 5-bit BS value to the 81 MB-limit with the current 8-bit BS value. Assuming only one 8-bit field is included, a technical effect of example embodiments of the present disclosure may be to reduce the worst-case over-reporting error from the current Short BSR with its roughly 39% worst-case over-reporting error, to 39%×6.5%=2.5% for buffer sizes not exceeding 2.4 Mbyte (the current 8-bit value whose maximum over-reporting error is within the 150000B-limit of the current 5-bit value).

With respect to the Long BSR with multiple BS values for given LCG, a technical effect of example embodiments of the present disclosure may be to make it unnecessary to introduce a new MAC-CE format. With respect to the Long BSR with multiple BS values for given LCG, a technical effect of example embodiments of the present disclosure may be limit increase in the reporting overhead to the additional buffer-size fields only. Assuming only one additional 8-bit field is included for an LCG, a technical effect of example embodiments of the present disclosure may be to double the reporting-value range from the 81 MB-limit with the current 8-bit BS value. Assuming only one additional 8-bit field is included for an LCG, a technical effect of example embodiments of the present disclosure may be to reduce the worst-case over-reporting error from the current Long BSR with its 6.5% worst-case over-reporting error, to 6.5%×6.5%=0.4% for buffer sizes not exceeding the 81 MB-limit with the current 8-bit BS value.

The NR MAC specification may be updated to read as follows:

" . . . 5.4.5 Buffer Status Reporting

The Buffer Status reporting (BSR) procedure is used to provide the serving gNB with information about UL data volume in the MAC entity.

RRC configures the following parameters to control the BSR:

periodicBSR-Timer;

retxBSR-Timer;

logicalChannelSR-DelayTimerApplied;

logicalChannelSR-DelayTimer;

logicalChannelSR-Mask;

logicalChannelGroup;

sdt-LogicalChannelSR-DelayTimer;

lces With AdditionalBSField.

< . . . >

For Regular and Periodic BSR, the MAC entity for which logicalChannelGroup-IAB-Ext is not configured by upper layers shall:

1> if more than one LCG has data available for transmission when the MAC PDU containing the BSR is to be built:

2> report Long BSR for all LCGs which have data available for transmission.

1> else if the LCG with data available for transmission is configured in lcgsWithAdditionalBSField:

2> report [Long Short BSR];

1> else:

2> report Short BSR.

< . . . >

For Padding BSR, the MAC entity for which logicalChannelGroup-IAB-Ext is not configured by upper layers shall:

1> if the number of padding bits is equal to or larger than the size of the Short BSR plus its subheader but smaller than the size of the Long BSR plus its subheader:

2> if more than one LCG has data available for transmission when the BSR is to be built:

3> if the number of padding bits is equal to the size of the Short BSR plus its subheader:

4> report Short Truncated BSR of the LCG with the highest priority logical channel with data available for transmission.

3> else:

4> report Long Truncated BSR of the LCG(s) with the logical channels having data available for transmission following a decreasing order of the highest priority logical channel (with or without data available for transmission) in each of these LCG(s), and in case of equal priority, in increasing order of LCGID.

2> else if any LCG is configured in lcgsWithAdditionalBSField and the number of padding bits is equal to or larger than the size of the [Long Short BSR]:

3> report [Long Short BSR];

2> else:

3> report Short BSR.

1> else if any LCG is configured in lcgsWithAdditionalBSField and the number of padding bits is equal to or larger than the size of the Long BSR with two buffer-size fields included for every LCG which has data available for transmission, plus its subheader:

2> report Long BSR with two buffer-size fields included for every LCG which has data available for transmission;

1> else if the number of padding bits is equal to or larger than the size of the Long BSR plus its subheader:

2> report Long BSR for all LCGs which have data available for transmission.

< . . . >

The MAC entity shall:

1> if the Buffer Status reporting procedure determines that at least one BSR has been triggered and not cancelled:

2> if UL-SCH resources are available for a new transmission and the UL-SCH resources can accommodate the BSR MAC CE plus its subheader as a result of logical channel prioritization:

3> instruct the Multiplexing and Assembly procedure to generate the BSR MAC CE(s) as defined in clause 6.1.3.1 and as follows:

4> if including more than one buffer-size fields for a LCG:

5> for every non-first buffer-size field for that LCG in the BSR MAC CE:

6> indicate the buffer-size value with the greatest upper limit that is less than or equal to the remaining unreported buffer size;

6> subtract from the remaining unreported buffer size the indicated upper limit;

5> in the first buffer-size field for that LCG in the BSR MAC CE, indicate the buffer-size value with the smallest upper limit that is greater than or equal to the remaining unreported buffer size.

3> start or restart periodicBSR-Timer except when all the generated BSRs are long or short Truncated or Extended long or short Truncated BSRs;

3> start or restart retxBSR-Timer.

6.1.3.1 Buffer Status Report MAC CEs

Buffer Status Report (BSR) MAC CEs consist of either:

Short BSR format (fixed size); or

[Long Short BSR] format (fixed size); or

Extended Short BSR format (fixed size); or

Long BSR format (variable size); or

Extended Long BSR format (variable size); or

Short Truncated BSR format (fixed size); or

Extended Short Truncated BSR format (fixed size); or

Long Truncated BSR format (variable size); or

Extended Long Truncated BSR format (variable size).

Pre-emptive BSR MAC CE consists of:

Pre-emptive BSR format (variable size); or

Extended Pre-emptive BSR format (variable size).

The BSR formats are identified by MAC subheaders with LCIDs as specified in Table 6.2.1-2.

The Extended BSR formats and Pre-emptive BSR format are identified by MAC subheaders with eLCIDs as specified in Table 6.2.1-2b.

The fields in the BSR MAC CE are defined as follows:

LCG ID: The Logical Channel Group ID field identifies the group of logical channel(s) whose buffer status is being reported. The length of the field is 3 bits for the case of Short BSR and Short Truncated BSR formats, and 8 bits for the case of Extended Short BSR and Extended Short Truncated BSR formats;

$LCG_i$: For the Long BSR format, Extended Long BSR format, Pre-emptive BSR format, and Extended Pre-emptive BSR format, this field indicates the presence of the Buffer Size field(s) for the logical channel group i. The $LCG_i$ field set to 1 indicates that the Buffer Size field(s) for the logical channel group i is reported. The $LCG_i$ field set to 0 indicates that the Buffer Size field for the logical channel group i is not reported. For the Long Truncated BSR format and the Extended Long Truncated BSR format, this field indicates whether logical channel group i has data available. The $LCG_i$ field set to 1 indicates that logical channel group i has data available. The $LCG_i$ field set to 0 indicates that logical channel group i does not have data available;

Buffer Size: The Buffer Size field(s) identifies the total amount of data available according to the data volume calculation procedure in TSs 38.322 [3] and 38.323 [4] across all logical channels of a logical channel group after the MAC PDU has been built (i.e. after the logical channel prioritization procedure, which may result the value of the Buffer Size field to zero). The amount of data is indicated in number of bytes. The size of the RLC headers and MAC subheaders are not considered in the buffer size computation. The length of this field for the Short BSR format, the [Long Short BSR] format and the Short Truncated BSR format is 5 bits. The length of this field for the Extended Short BSR format and the Extended Short Truncated BSR format is 8 bits. The length of this field for the Long BSR format, the Long Truncated BSR format, the Extended Long BSR format, the [Long Short BSR] format, and the Extended Long Truncated format is 8 bits. The values for the 5-bit and 8-bit Buffer Size fields are shown in Tables 6.1.3.1-1 and 6.1.3.1-2, respectively. For the Long BSR format, the Long Truncated BSR format, the Extended Long BSR format, and the Extended Long Truncated format, the Buffer Size fields are included in ascending order based on the $LCG_i$ with two fields included for every LCG configured in legs WithAdditionalBSField, or for every LCG in a padding BSR if allowed by the number of padding bits and any LCG is configured in lcgs WithAdditionalBSField. For the Long Truncated BSR format and the Extended Long Truncated format the number of Buffer Size fields included is maximised, while not exceeding the number of padding bits. For the Pre-emptive BSR format and the Extended Pre-emptive BSR format, the Buffer Size field identifies the total amount of the data expected to arrive at the IAB-MT of the node where the Pre-emptive BSR/Extended Pre-emptive BSR is triggered and does not include the volume of data currently available in the IAB-MT. Pre-emptive BSR format is identical to the Long BSR format. Extended Pre-emptive BSR format is identical to the Extended Long BSR format.

< . . . > . . . "

Figure 4:
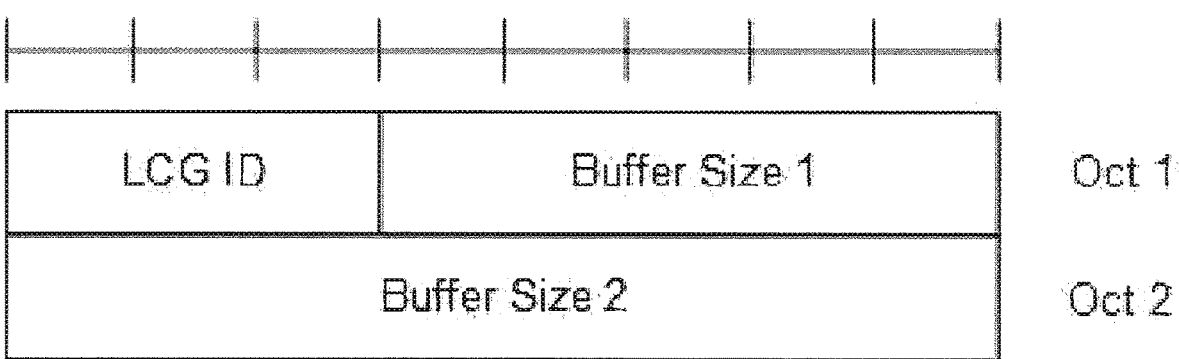
FIG. 4 is a diagram illustrating features as described herein.

Referring now to FIG. 4, illustrated is an example of a long Short BSR MAC CE according to an example embodiment of the present disclosure. The NR MAC specification may be updated to include FIG. 4.

TABLE 2 illustrates that Table 6.2.1-2 Values of LCID for UL-SCH of the NR MAC specification may be updated to include Long Short BSR at index 42:

TABLE 2

| Codepoint/ Index | LCID values |
|---|---|
| 0 | CCCH of size 64 bits (referred to as "CCCH1" in TS 38.331 [5]), except for a RedCap UE |
| 1-32 | Identity of the logical channel of DCCH and DTCH |
| 33 | Extended logical channel ID field (two-octet eLCID field) |
| 34 | Extended logical channel ID field (one-octet eLCID field) |
| 35 | CCCH of size 48 bits (referred to as "CCCH" in TS 38.331 [5]) for a RedCap UE |
| 36 | CCCH of size 64 bits (referred to as "CCCH1" in TS 38.331 [5]) for a RedCap UE |
| 37-41 | Reserved |
| 42 | [Long Short BSR] |
| 43 | Truncated Enhanced BFR (one octet $C_i$) |
| 44 | Timing Advance Report |
| 45 | Truncated Sidelink BSR |
| 46 | Sidelink BSR |
| 47 | Reserved |
| 48 | LBT failure (four octets) |
| 49 | LBT failure (one octet) |
| 50 | BFR (one octet Ci) |
| 51 | Truncated BFR (one octet Ci) |

TABLE 2-continued

| Codepoint/ Index | LCID values |
|---|---|
| 52 | CCCH of size 48 bits (referred to as "CCCH" in TS 38.331 [5]), except for a RedCap UE |
| 53 | Recommended bit rate query |
| 54 | Multiple Entry PHR (four octets $C_i$) |
| 55 | Configured Grant Confirmation |
| 56 | Multiple Entry PHR (one octet $C_i$) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |

It may be noted that the above section of the updated NR MAC specification includes a reporting algorithm. In an example embodiment, using this algorithm and the existing buffer-size tables in the MAC TS 38.321, see TABLE 1, the following examples may be derived, as illustrated in TABLE 3:

TABLE 3

| | Reported buffer-size fields using: | | | |
|---|---|---|---|---|
| Buffer size (of LCG) at UE to report (bytes) | 5 + 8 buffer-size bits ("Long short BSR") | 5 + 8 + 8 buffer-size bits ("Long short BSR") | 8 + 8 buffer-size bits (Long BSR) | 8 + 8 + 8 buffer-size bits (Long BSR) |
| 20 000 | 5-bit: "≤1446" 8-bit: "≤18951" Interpreted at reception as ≤18951 + 1446 = 20 397 | 5-bit: "≤74" 8-bit: "≤987" 8-bit: "≤18951" Interpreted at reception as ≤18951 + 987 + 74 = 20 012 | 8-bit: "≤1051" 8-bit: "≤18951" Interpreted at reception as ≤18951 + 1051 = 20 002 | 8-bit: "≤62" 8-bit: "≤987" 8-bit: "≤18951" Interpreted at reception as ≤18951 + 987 + 62 = 20 000 |
| 200 000 | 5-bit: "≤7587" 8-bit: "≤194182" Interpreted at reception as ≤194182 + 7587 = 201 769 | 5-bit: "≤102" 8-bit: "≤5737" 8-bit: "≤194182" Interpreted at reception as ≤194182 + 5737 + 102 = 200 021 | 8-bit: "≤6109" 8-bit: "≤194182" Interpreted at reception as ≤194182 + 6109 = 200 291 | 8-bit: "≤85" 8-bit: "≤5737" 8-bit: "≤194182" Interpreted at reception as ≤194182 + 5737 + 85 = 200 004 |
| 2 000 000 | 5-bit: "≤10570" 8-bit: "≤1989774" Interpreted at reception as ≤1989774 + 10570 = 2 000 344 | 5-bit: "≤142" 8-bit: "≤10104" 8-bit: "≤1989774" Interpreted at reception as ≤1989774 + 10104 + 142 = 2 000 020 | 8-bit: "≤10760" 8-bit: "≤1989774" Interpreted at reception as ≤194182 + 6109 = 2 000 534 | 8-bit: "≤124" 8-bit: "≤10104" 8-bit: "≤1989774" Interpreted at reception as ≤1989774 + 10104 + 124 = 2 000 002 |
| 20 000 000 | 5-bit: ">150 000" 8-bit: "≤19 146 385" Interpreted at reception as >19146385 + 150000 and ≤20 389 201 (the next 8-bit value) | 5-bit: "≤39 818" 8-bit: "≤824 928" 8-bit: "≤19 146 385" Interpreted at reception as ≤19146385 + 824928 + 39818 = 20 011 131 | 8-bit: "≤878 475" 8-bit: "≤19 146 385" Interpreted at reception as ≤19146385 + 878475 = 20 024 860 | 8-bit: "≤29 431" 8-bit: "≤824 928" 8-bit: "≤19 146 385" Interpreted at reception as ≤19146385 + 824928 + 29431 = 20 000 744 |

Example embodiments of the present disclosure may be applicable to devices used in XR. XR relates to a variety of immersive technologies, including but not limited to virtual reality (VR), augmented reality (AR), and mixed reality (MR). Virtual reality (VR) is an area of technology in which video content may be provided (e.g. streamed) to, for example, a VR display system. VR video content may be provided alongside other VR content, such as audio, haptic, etc. content. The VR display system may be provided with a live or stored feed from a video content source, the feed representing a VR space or world for immersive output through the display system. A virtual space or virtual world is any computer-generated version of a space, for example a captured real-world space, in which a user can be immersed through a display system such as a VR headset. A VR headset may be configured to provide VR video and audio content to the user, e.g. through the use of a pair of video screens and headphones incorporated within, or associated with, the headset. A VR headset may be configured to provide feedback, for example pose/haptic data, to a server for purposes of informing the provision of VR content. Augmented reality (AR) and mixed reality (MR) may be similar to VR in that video content may be provided, as above, which may be overlaid over or combined with aspects of a real-world environment in which the AR/MR content is being consumed. A user of AR content may therefore experience a version of the real-world environment that is "augmented" with additional virtual features, such as virtual visual and/or audio objects. A device may provide AR video and audio content overlaid over a visible, see-through, or recorded version of the real-world visual and audio elements.

FIG. 5 illustrates the potential steps of an example method 500. The example method 500 may include: determining to report an amount of data in a transmission buffer, 510; determining respective values for a plurality of buffer-size fields that are configured to jointly indicate the amount of data in the transmission buffer, wherein the respective values are determined based on the amount of data in the transmission buffer, 520; generating a buffer-status report, wherein the buffer-status report comprises, at least, the plurality of buffer-size fields, 530; generating a protocol data unit, wherein the protocol data unit comprises, at least, the buffer-status report, 540; and transmitting the protocol data unit, 550. The example method 500 may be performed, for example, with a UE. The protocol data unit may be transmitted to a network.

FIG. 6 illustrates the potential steps of an example method 6. The example method 600 may include: receiving, from a user equipment, a protocol data unit, wherein the protocol data unit comprises, at least, a buffer-status report, wherein the buffer status report comprises, at least, a plurality of buffer-size fields that are configured to jointly indicate an amount of data in a transmission buffer of the user equipment, wherein respective values of the plurality of buffer-size fields comprise values that are determined based on the amount of data in the transmission buffer, 610; and determining at least one of: a lower bound for the data in the transmission buffer, or an upper bound for the data in the transmission buffer based on the plurality of buffer-size fields, 620. The example method 600 may be performed, for example, with a base station, gNB, network entity, etc.

In accordance with one example embodiment, an apparatus may comprise: at least one processor; and at least one memory storing instructions that, when executed by the at least one processor, cause the apparatus at least to: determine to report an amount of data in a transmission buffer; deter-mine respective values for a plurality of buffer-size fields that may be configured to jointly indicate the amount of data in the transmission buffer, wherein the respective values may be determined based on the amount of data in the transmission buffer; generate a buffer-status report, wherein the buffer-status report may comprise, at least, the plurality of buffer-size fields; generate a protocol data unit, wherein the protocol data unit may comprise, at least, the buffer-status report; and transmit the protocol data unit.

The example apparatus may be further configured to: receive a configuration message, wherein the configuration message may be configured to indicate that the plurality of buffer-size fields are to be used to jointly indicate the amount of data in the transmission buffer.

The generated protocol data unit may further comprise a header, wherein the header may be configured to indicate that the generated protocol data unit comprises the buffer-status report.

The data in the transmission buffer may be associated with one of: one or more radio bearers assigned to a logical-channel group, or the logical-channel group.

The generating of the buffer-status report comprising the plurality of buffer-size fields may be performed in response to at least one of: at least one radio resource control configuration associated with the logical-channel group, a reporting error associated with fields of the buffer-status report used for the logical-channel group, or a configuration of the apparatus.

Respective ones of the plurality of buffer-size fields may be configured to indicate at least one of: a predefined lower bound for a range of buffer-size values, or a predefined upper bound for the range of buffer-size values.

The predefined lower bound may be at least partially different from the predefined upper bound.

A subset of the respective values for the plurality of buffer-size fields may be configured to be added together.

At least some of the respective values for the plurality of buffer-size fields may be configured to be subtracted from a sum of remaining ones of the respective values for the plurality of buffer-size fields.

The buffer-status report may further comprise an identifier associated with the transmission buffer.

In accordance with one aspect, an example method may be provided comprising:

determining, with a user equipment, to report an amount of data in a transmission buffer; determining respective values for a plurality of buffer-size fields that may be configured to jointly indicate the amount of data in the transmission buffer, wherein the respective values may be determined based on the amount of data in the transmission buffer; generating a buffer-status report, wherein the buffer-status report may comprise, at least, the plurality of buffer-size fields; generating a protocol data unit, wherein the protocol data unit may comprise, at least, the buffer-status report; and transmitting the protocol data unit.

The example method may further comprise: receiving a configuration message, wherein the configuration message may be configured to indicate that the plurality of buffer-size fields are to be used to jointly indicate the amount of data in the transmission buffer.

The generated protocol data unit may further comprise a header, wherein the header may be configured to indicate that the generated protocol data unit comprises the buffer-status report.

The data in the transmission buffer may be associated with one of: one or more radio bearers assigned to a logical-channel group, or the logical-channel group.

The generating of the buffer-status report comprising the plurality of buffer-size fields may be performed in response to at least one of: at least one radio resource control configuration associated with the logical-channel group, a reporting error associated with fields of the buffer-status report used for the logical-channel group, or a configuration of the user equipment.

Respective ones of the plurality of buffer-size fields may be configured to indicate at least one of: a predefined lower bound for a range of buffer-size values, or a predefined upper bound for the range of buffer-size values.

The predefined lower bound may be at least partially different from the predefined upper bound.

A subset of the respective values for the plurality of buffer-size fields may be configured to be added together.

At least some of the respective values for the plurality of buffer-size fields may be configured to be subtracted from a sum of remaining ones of the respective values for the plurality of buffer-size fields.

The buffer-status report may further comprise an identifier associated with the transmission buffer.

In accordance with one example embodiment, an apparatus may comprise: circuitry configured to perform: determining, with a user equipment, to report an amount of data in a transmission buffer; circuitry configured to perform: determining respective values for a plurality of buffer-size fields that may be configured to jointly indicate the amount of data in the transmission buffer, wherein the respective values may be determined based on the amount of data in the transmission buffer; circuitry configured to perform: generating a buffer-status report, wherein the buffer-status report may comprise, at least, the plurality of buffer-size fields; circuitry configured to perform: generating a protocol data unit, wherein the protocol data unit may comprise, at least, the buffer-status report; and circuitry configured to perform: transmitting the protocol data unit.

In accordance with one example embodiment, an apparatus may comprise: processing circuitry; memory circuitry including computer program code, the memory circuitry and the computer program code configured to, with the processing circuitry, enable the apparatus to: determine to report an amount of data in a transmission buffer; determine respective values for a plurality of buffer-size fields that may be configured to jointly indicate the amount of data in the transmission buffer, wherein the respective values may be determined based on the amount of data in the transmission buffer; generate a buffer-status report, wherein the buffer-status report may comprise, at least, the plurality of buffer-size fields; generate a protocol data unit, wherein the protocol data unit may comprise, at least, the buffer-status report; and transmit the protocol data unit.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: determining to report an amount of data in a transmission buffer; determining respective values for a plurality of buffer-size fields that may be configured to jointly indicate the amount of data in the transmission buffer, wherein the respective values may be determined based on the amount of data in the transmission buffer; generating a buffer-status report, wherein the buffer-status report may comprise, at least, the plurality of buffer-size fields; generating a protocol data unit, wherein the protocol data unit may comprise, at least, the buffer-status report; and transmitting the protocol data unit.

The means may be further configured to perform: receiving a configuration message, wherein the configuration message may be configured to indicate that the plurality of buffer-size fields are to be used to jointly indicate the amount of data in the transmission buffer.

The generated protocol data unit may further comprise a header, wherein the header may be configured to indicate that the generated protocol data unit comprises the buffer-status report.

The data in the transmission buffer may be associated with one of: one or more radio bearers assigned to a logical-channel group, or the logical-channel group.

The generating of the buffer-status report comprising the plurality of buffer-size fields may be performed in response to at least one of: at least one radio resource control configuration associated with the logical-channel group, a reporting error associated with fields of the buffer-status report used for the logical-channel group, or a configuration of the apparatus.

Respective ones of the plurality of buffer-size fields may be configured to indicate at least one of: a predefined lower bound for a range of buffer-size values, or a predefined upper bound for the range of buffer-size values.

The predefined lower bound may be at least partially different from the predefined upper bound.

A subset of the respective values for the plurality of buffer-size fields may be configured to be added together.

At least some of the respective values for the plurality of buffer-size fields may be configured to be subtracted from a sum of remaining ones of the respective values for the plurality of buffer-size fields.

The buffer-status report may further comprise an identifier associated with the transmission buffer.

A processor, memory, and/or example algorithms (which may be encoded as instructions, program, or code) may be provided as example means for providing or causing performance of operation.

In accordance with one example embodiment, a non-transitory computer-readable medium comprising instructions stored thereon which, when executed with at least one processor, cause the at least one processor to: determine to report an amount of data in a transmission buffer; determine respective values for a plurality of buffer-size fields that may be configured to jointly indicate the amount of data in the transmission buffer, wherein the respective values may be determined based on the amount of data in the transmission buffer; generating a buffer-status report, wherein the buffer-status report may comprise, at least, the plurality of buffer-size fields; generate a protocol data unit, wherein the protocol data unit may comprise, at least, the buffer-status report; and cause transmitting of the protocol data unit.

In accordance with one example embodiment, a non-transitory computer-readable medium comprising program instructions stored thereon for performing at least the following: determining to report an amount of data in a transmission buffer; determining respective values for a plurality of buffer-size fields that may be configured to jointly indicate the amount of data in the transmission buffer, wherein the respective values may be determined based on the amount of data in the transmission buffer; generating a buffer-status report, wherein the buffer-status report may comprise, at least, the plurality of buffer-size fields; generating a protocol data unit, wherein the protocol data unit may comprise, at least, the buffer-status report; and causing transmitting of the protocol data unit.

In accordance with another example embodiment, a non-transitory program storage device readable by a machine may be provided, tangibly embodying instructions executable by the machine for performing operations, the operations comprising: determining to report an amount of data in a transmission buffer; determining respective values for a plurality of buffer-size fields that may be configured to jointly indicate the amount of data in the transmission buffer, wherein the respective values may be determined based on the amount of data in the transmission buffer; generating a buffer-status report, wherein the buffer-status report may comprise, at least, the plurality of buffer-size fields; generating a protocol data unit, wherein the protocol data unit may comprise, at least, the buffer-status report; and causing transmitting of the protocol data unit.

In accordance with another example embodiment, a non-transitory computer-readable medium comprising instructions that, when executed by an apparatus, cause the apparatus to perform at least the following: determining to report an amount of data in a transmission buffer; determining respective values for a plurality of buffer-size fields that may be configured to jointly indicate the amount of data in the transmission buffer, wherein the respective values may be determined based on the amount of data in the transmission buffer; generating a buffer-status report, wherein the buffer-status report may comprise, at least, the plurality of buffer-size fields; generating a protocol data unit, wherein the protocol data unit may comprise, at least, the buffer-status report; and causing transmitting of the protocol data unit.

A computer implemented system comprising: at least one processor and at least one non-transitory memory storing instructions that, when executed by the at least one processor, cause the system at least to perform: determining to report an amount of data in a transmission buffer; determining respective values for a plurality of buffer-size fields that may be configured to jointly indicate the amount of data in the transmission buffer, wherein the respective values may be determined based on the amount of data in the transmission buffer; generating a buffer-status report, wherein the buffer-status report may comprise, at least, the plurality of buffer-size fields; generating a protocol data unit, wherein the protocol data unit may comprise, at least, the buffer-status report; and causing transmitting of the protocol data unit.

A computer implemented system comprising: means for determining to report an amount of data in a transmission buffer; means for determining respective values for a plurality of buffer-size fields that may be configured to jointly indicate the amount of data in the transmission buffer, wherein the respective values may be determined based on the amount of data in the transmission buffer; means for generating a buffer-status report, wherein the buffer-status report may comprise, at least, the plurality of buffer-size fields; means for generating a protocol data unit, wherein the protocol data unit may comprise, at least, the buffer-status report; and means for causing transmitting of the protocol data unit.

In accordance with one example embodiment, an apparatus may comprise: at least one processor; and at least one memory storing instructions that, when executed by the at least one processor, cause the apparatus at least to: receive, from a user equipment, a protocol data unit, wherein the protocol data unit may comprise, at least, a buffer-status report, wherein the buffer status report may comprise, at least, a plurality of buffer-size fields that may be configured to jointly indicate an amount of data in a transmission buffer of the user equipment, wherein respective values of the plurality of buffer-size fields may comprise values that are determined based on the amount of data in the transmission buffer; and determine at least one of: a lower bound for the data in the transmission buffer, or an upper bound for the data in the transmission buffer based on the plurality of buffer-size fields.

The example apparatus may be further configured to: determine to indicate that the plurality of buffer-size fields are to be used to jointly indicate the amount of data in the transmission buffer; generate a configuration message, wherein the configuration message may be configured to indicate that the plurality of buffer-size fields are to be used to jointly indicate the amount of data in the transmission buffer; and transmit, to the user equipment, the configuration message.

The configuration message may be transmitted via a radio resource control message.

The protocol data unit may further comprise a header, wherein the header may be configured to indicate that the received protocol data unit comprises the buffer-status report.

The example apparatus may be further configured to: associate the at least one of the lower bound, or the upper bound with the transmission buffer.

Respective ones of the plurality of buffer-size fields may be configured to indicate at least one of: a predefined lower bound for a range of buffer-size values, or a predefined upper bound for the range of buffer-size values.

The predefined lower bound may be at least partially different from the predefined upper bound.

The data in the transmission buffer may be associated with one of: one or more radio bearers assigned to a logical-channel group, or the logical-channel group.

The determining of the at least one of: the lower bound for the data in the transmission buffer, or the upper bound for the data in the transmission buffer may comprise the example being further configured to: add together a subset of respective values of the plurality of buffer-size fields.

The determining of the at least one of: the lower bound for the data in the transmission buffer, or the upper bound for the data in the transmission buffer may comprise the example being further configured to: subtract at least some respective values of the plurality of buffer-size fields from a sum of remaining respective values of the plurality of buffer-size fields.

The lower bound may be at least partially different from the upper bound.

In accordance with one aspect, an example method may be provided comprising: receiving, from a user equipment, a protocol data unit, wherein the protocol data unit may comprise, at least, a buffer-status report, wherein the buffer status report may comprise, at least, a plurality of buffer-size fields that may be configured to jointly indicate an amount of data in a transmission buffer of the user equipment, wherein respective values of the plurality of buffer-size fields may comprise values that are determined based on the amount of data in the transmission buffer; and determining at least one of: a lower bound for the data in the transmission buffer, or an upper bound for the data in the transmission buffer based on the plurality of buffer-size fields.

The example method may further comprise: determining to indicate that the plurality of buffer-size fields are to be used to jointly indicate the amount of data in the transmission buffer; generating a configuration message, wherein the configuration message may be configured to indicate that the plurality of buffer-size fields are to be used to jointly indicate the amount of data in the transmission buffer; and transmitting, to the user equipment, the configuration message.

The configuration message may be transmitted via a radio resource control message.

The protocol data unit may further comprise a header, wherein the header may be configured to indicate that the received protocol data unit comprises the buffer-status report.

The example method may further comprise: associating the at least one of the lower bound, or the upper bound with the transmission buffer.

Respective ones of the plurality of buffer-size fields may be configured to indicate at least one of: a predefined lower bound for a range of buffer-size values, or a predefined upper bound for the range of buffer-size values.

The predefined lower bound may be at least partially different from the predefined upper bound.

The data in the transmission buffer may be associated with one of: one or more radio bearers assigned to a logical-channel group, or the logical-channel group.

The determining of the at least one of: the lower bound for the data in the transmission buffer, or the upper bound for the data in the transmission buffer may comprise: adding together a subset of respective values of the plurality of buffer-size fields.

The determining of the at least one of: the lower bound for the data in the transmission buffer, or the upper bound for the data in the transmission buffer may comprise: subtracting at least some respective values of the plurality of buffer-size fields from a sum of remaining respective values of the plurality of buffer-size fields.

The lower bound may be at least partially different from the upper bound.

In accordance with one example embodiment, an apparatus may comprise: circuitry configured to perform: receiving, from a user equipment, a protocol data unit, wherein the protocol data unit may comprise, at least, a buffer-status report, wherein the buffer status report may comprise, at least, a plurality of buffer-size fields that may be configured to jointly indicate an amount of data in a transmission buffer of the user equipment, wherein respective values of the plurality of buffer-size fields may comprise values that are determined based on the amount of data in the transmission buffer; and circuitry configured to perform: determining at least one of: a lower bound for the data in the transmission buffer, or an upper bound for the data in the transmission buffer based on the plurality of buffer-size fields.

In accordance with one example embodiment, an apparatus may comprise: processing circuitry; memory circuitry including computer program code, the memory circuitry and the computer program code configured to, with the processing circuitry, enable the apparatus to: receive, from a user equipment, a protocol data unit, wherein the protocol data unit may comprise, at least, a buffer-status report, wherein the buffer status report may comprise, at least, a plurality of buffer-size fields that may be configured to jointly indicate an amount of data in a transmission buffer of the user equipment, wherein respective values of the plurality of buffer-size fields may comprise values that are determined based on the amount of data in the transmission buffer; and determine at least one of: a lower bound for the data in the transmission buffer, or an upper bound for the data in the transmission buffer based on the plurality of buffer-size fields.

In accordance with one example embodiment, an apparatus may comprise means for performing: receiving, from a user equipment, a protocol data unit, wherein the protocol data unit may comprise, at least, a buffer-status report, wherein the buffer status report may comprise, at least, a plurality of buffer-size fields that may be configured to jointly indicate an amount of data in a transmission buffer of the user equipment, wherein respective values of the plurality of buffer-size fields may comprise values that are determined based on the amount of data in the transmission buffer; and determining at least one of: a lower bound for the data in the transmission buffer, or an upper bound for the data in the transmission buffer based on the plurality of buffer-size fields.

The means may be further configured to perform: determining to indicate that the plurality of buffer-size fields are to be used to jointly indicate the amount of data in the transmission buffer; generating a configuration message, wherein the configuration message may be configured to indicate that the plurality of buffer-size fields are to be used to jointly indicate the amount of data in the transmission buffer; and transmitting, to the user equipment, the configuration message.

The configuration message may be transmitted via a radio resource control message.

The protocol data unit may further comprise a header, wherein the header may be configured to indicate that the received protocol data unit comprises the buffer-status report.

The means may be further configured to perform: associating the at least one of the lower bound, or the upper bound with the transmission buffer.

Respective ones of the plurality of buffer-size fields may be configured to indicate at least one of: a predefined lower bound for a range of buffer-size values, or a predefined upper bound for the range of buffer-size values.

The predefined lower bound may be at least partially different from the predefined upper bound.

The data in the transmission buffer may be associated with one of: one or more radio bearers assigned to a logical-channel group, or the logical-channel group.

The means configured to perform determining of the at least one of: the lower bound for the data in the transmission buffer, or the upper bound for the data in the transmission buffer may comprise means configured to perform: adding together a subset of respective values of the plurality of buffer-size fields.

The means configured to perform determining of the at least one of: the lower bound for the data in the transmission buffer, or the upper bound for the data in the transmission buffer may comprise means configured to perform: subtracting at least some respective values of the plurality of buffer-size fields from a sum of remaining respective values of the plurality of buffer-size fields.

The lower bound may be at least partially different from the upper bound.

In accordance with one example embodiment, a non-transitory computer-readable medium comprising instructions stored thereon which, when executed with at least one processor, cause the at least one processor to: cause receiving, from a user equipment, of a protocol data unit, wherein the protocol data unit may comprise, at least, a buffer-status report, wherein the buffer status report may comprise, at least, a plurality of buffer-size fields that may be configured to jointly indicate an amount of data in a transmission buffer of the user equipment, wherein respective values of the plurality of buffer-size fields may comprise values that are determined based on the amount of data in the transmission buffer; and determine at least one of: a lower bound for the data in the transmission buffer, or an upper bound for the data in the transmission buffer based on the plurality of buffer-size fields.

In accordance with one example embodiment, a non-transitory computer-readable medium comprising program instructions stored thereon for performing at least the following: causing receiving, from a user equipment, of a protocol data unit, wherein the protocol data unit may comprise, at least, a buffer-status report, wherein the buffer status report may comprise, at least, a plurality of buffer-size fields that may be configured to jointly indicate an amount of data in a transmission buffer of the user equipment, wherein respective values of the plurality of buffer-size fields may comprise values that are determined based on the amount of data in the transmission buffer; and determining at least one of: a lower bound for the data in the transmission buffer, or an upper bound for the data in the transmission buffer based on the plurality of buffer-size fields.

In accordance with another example embodiment, a non-transitory program storage device readable by a machine may be provided, tangibly embodying instructions executable by the machine for performing operations, the operations comprising: causing receiving, from a user equipment, of a protocol data unit, wherein the protocol data unit may comprise, at least, a buffer-status report, wherein the buffer status report may comprise, at least, a plurality of buffer-size fields that may be configured to jointly indicate an amount of data in a transmission buffer of the user equipment, wherein respective values of the plurality of buffer-size fields may comprise values that are determined based on the amount of data in the transmission buffer; and determining at least one of: a lower bound for the data in the transmission buffer, or an upper bound for the data in the transmission buffer based on the plurality of buffer-size fields.

In accordance with another example embodiment, a non-transitory computer-readable medium comprising instructions that, when executed by an apparatus, cause the apparatus to perform at least the following: causing receiving, from a user equipment, of a protocol data unit, wherein the protocol data unit may comprise, at least, a buffer-status report, wherein the buffer status report may comprise, at least, a plurality of buffer-size fields that may be configured to jointly indicate an amount of data in a transmission buffer of the user equipment, wherein respective values of the plurality of buffer-size fields may comprise values that are determined based on the amount of data in the transmission buffer; and determining at least one of: a lower bound for the data in the transmission buffer, or an upper bound for the data in the transmission buffer based on the plurality of buffer-size fields.

A computer implemented system comprising: at least one processor and at least one non-transitory memory storing instructions that, when executed by the at least one processor, cause the system at least to perform: causing receiving, from a user equipment, of a protocol data unit, wherein the protocol data unit may comprise, at least, a buffer-status report, wherein the buffer status report may comprise, at least, a plurality of buffer-size fields that may be configured to jointly indicate an amount of data in a transmission buffer of the user equipment, wherein respective values of the plurality of buffer-size fields may comprise values that are determined based on the amount of data in the transmission buffer; and determining at least one of: a lower bound for the data in the transmission buffer, or an upper bound for the data in the transmission buffer based on the plurality of buffer-size fields.

A computer implemented system comprising: means for causing receiving, from a user equipment, of a protocol data unit, wherein the protocol data unit may comprise, at least, a buffer-status report, wherein the buffer status report may comprise, at least, a plurality of buffer-size fields that may be configured to jointly indicate an amount of data in a transmission buffer of the user equipment, wherein respective values of the plurality of buffer-size fields may comprise values that are determined based on the amount of data in the transmission buffer; and means for determining at least one of: a lower bound for the data in the transmission buffer, or an upper bound for the data in the transmission buffer based on the plurality of buffer-size fields.

The term "non-transitory," as used herein, is a limitation of the medium itself (i.e. tangible, not a signal) as opposed to a limitation on data storage persistency (e.g., RAM vs. ROM).

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. A user equipment (UE) comprising:

at least one processor; and at least one non-transitory memory storing instructions that, when executed by the at least one processor, cause the UE to perform the following operations:

determine that uplink data associated with a logical-channel group (LCG) is buffered for transmission;

determine that the UE is configured to report the buffered uplink data using multiple buffer-size fields for the same LCG within a single buffer-status report (BSR) medium access control (MAC) control element;

determine respective values for a plurality of buffer-size fields associated with the same LCG, wherein:

each buffer-size field has a predefined upper bound defined by an existing buffer-size table; and the respective values are selected by:

indicating, for each non-first buffer-size field, a buffer-size value having a greatest upper bound that is less than or equal to a remaining unreported buffer amount, and subtracting the indicated upper bound from the remaining unreported buffer amount; and indicating, for a first buffer-size field, a buffer-size value having a smallest upper bound that is greater than or equal to the remaining unreported buffer amount;

generate a single BSR MAC control element that includes the plurality of buffer-size fields for the same LCG;

multiplex the BSR MAC control element into a protocol data unit (PDU) without including a second BSR MAC control element for the LCG; and transmit the protocol data unit to a radio access network node.

2. The UE of claim 1, wherein the plurality of buffer-size fields includes at least one 5-bit buffer-size field and at least one 8-bit buffer-size field associated with the same logical-channel group.

3. The UE of claim 2, wherein the buffer-status report MAC control element comprises a Long Short BSR format identified by a logical channel identifier distinct from a legacy Short BSR.

4. The UE of claim 3, wherein the plurality of buffer-size fields are included within a fixed-size MAC control element, and a number of the plurality of buffer-size fields is indicated by a MAC subheader associated with the MAC control element.

5. The UE of claim 4, wherein the determination that the UE is configured to report the buffered uplink data using the plurality of buffer-size fields is based on radio resource control (RRC) configuration identifying the logical-channel group as supporting additional buffer-size fields.

6. The UE of claim 5, wherein the respective values of the plurality of buffer-size fields are selected such that a sum of upper bounds indicated by the plurality of buffer-size fields defines an upper bound for the buffered uplink data.

7. The UE of claim 6, wherein the respective values of the plurality of buffer-size fields are selected such that a difference between an upper bound indicated by a first buffer-size field and upper bounds indicated by one or more additional buffer-size fields defines an upper bound for the buffered uplink data.

8. The UE of claim 7, wherein the generation of the buffer-status report MAC control element is performed in response to a determination that a reporting error associated with a legacy single buffer-size field exceeds a threshold.

9. The UE of claim 8, wherein the buffer-status report MAC control element is generated as a padding buffer-status report when unused padding bits are available in the protocol data unit.

10. The UE of claim 9, wherein the plurality of buffer-size fields are included only for logical-channel groups associated with extended-reality (XR) traffic.

11. A method performed by a user equipment (UE), the method comprising:

determining that uplink data associated with a logical-channel group (LCG) is buffered for transmission;

determining that the UE is configured to report the buffered uplink data using multiple buffer-size fields for the same LCG within a single buffer-status report (BSR) medium access control (MAC) control element;

determining respective values for a plurality of buffer-size fields associated with the same LCG, wherein:

each buffer-size field has a predefined upper bound defined by an existing buffer-size table; and the respective values are selected by:

indicating, for each non-first buffer-size field, a buffer-size value having a greatest upper bound that is less than or equal to a remaining unreported buffer amount, and subtracting the indicated upper bound from the remaining unreported buffer amount; and indicating, for a first buffer-size field, a buffer-size value having a smallest upper bound that is greater than or equal to the remaining unreported buffer amount;

generating a single BSR MAC control element that includes the plurality of buffer-size fields for the same LCG;

multiplexing the BSR MAC control element into a protocol data unit (PDU) without including a second BSR MAC control element for the LCG; and transmitting the protocol data unit to a radio access network node.

12. The method of claim 11, wherein the plurality of buffer-size fields includes at least one 5-bit buffer-size field and at least one 8-bit buffer-size field associated with the same logical-channel group.

13. The method of claim 12, wherein the buffer-status report MAC control element comprises a Long Short BSR format identified by a logical channel identifier distinct from a legacy Short BSR.

14. The method of claim 13, wherein the plurality of buffer-size fields are included within a fixed-size MAC control element, and a number of the plurality of buffer-size fields is indicated by a MAC subheader associated with the MAC control element.

15. The method of claim 14, wherein the determination that the UE is configured to report the buffered uplink data using the plurality of buffer-size fields is based on radio resource control (RRC) configuration identifying the logical-channel group as supporting additional buffer-size fields.

16. The method of claim 15, wherein the respective values of the plurality of buffer-size fields are selected such that a sum of upper bounds indicated by the plurality of buffer-size fields defines an upper bound for the buffered uplink data.

17. The method of claim 16, wherein the respective values of the plurality of buffer-size fields are selected such that a difference between an upper bound indicated by a first buffer-size field and upper bounds indicated by one or more additional buffer-size fields defines an upper bound for the buffered uplink data.

18. The method of claim 17, wherein the generation of the buffer-status report MAC control element is performed in response to a determination that a reporting error associated with a legacy single buffer-size field exceeds a threshold.

19. The method of claim 18, wherein the buffer-status report MAC control element is generated as a padding buffer-status report when unused padding bits are available in the protocol data unit.

20. The method of claim 19, wherein the plurality of buffer-size fields are included only for logical-channel groups associated with extended-reality (XR) traffic.

* * * * *